United States Patent

Patzer

[11] 3,861,692
[45] Jan. 21, 1975

[54] COLLET AND ADJUSTING SCREW THEREFOR

[75] Inventor: Helmut Karl Patzer, Ilgen, Germany

[73] Assignee: Borg-Warner-Stieber GmbH, Heidelberg, Germany

[22] Filed: Aug. 11, 1972

[21] Appl. No.: 280,006

[30] Foreign Application Priority Data
Aug. 20, 1971 Germany............................ 7131832

[52] U.S. Cl. ............................................... 279/2 R
[51] Int. Cl. ............................................ B23b 31/40
[58] Field of Search .......... 279/2; 408/168; 51/339; 269/48.1; 242/72.1; 81/72; 82/44

[56] References Cited
UNITED STATES PATENTS

| 291,282 | 1/1884 | Blue | 279/2 |
|---|---|---|---|
| 404,477 | 6/1889 | Griffen | 82/44 |
| 1,839,537 | 1/1932 | Eisenmann | 408/168 X |
| 2,851,274 | 9/1958 | Greer | 279/2 |
| 3,017,192 | 1/1962 | Illowsek | 279/2 |
| 3,214,107 | 10/1965 | Atkin | 279/2 X |

*Primary Examiner*—Gil Weidenfeld
*Attorney, Agent, or Firm*—Herman E. Smith

[57] ABSTRACT

A collet and adjusting screw therefor in which the head of the adjusting screw is engageable with the collet by means of a snapping connection.

10 Claims, 2 Drawing Figures

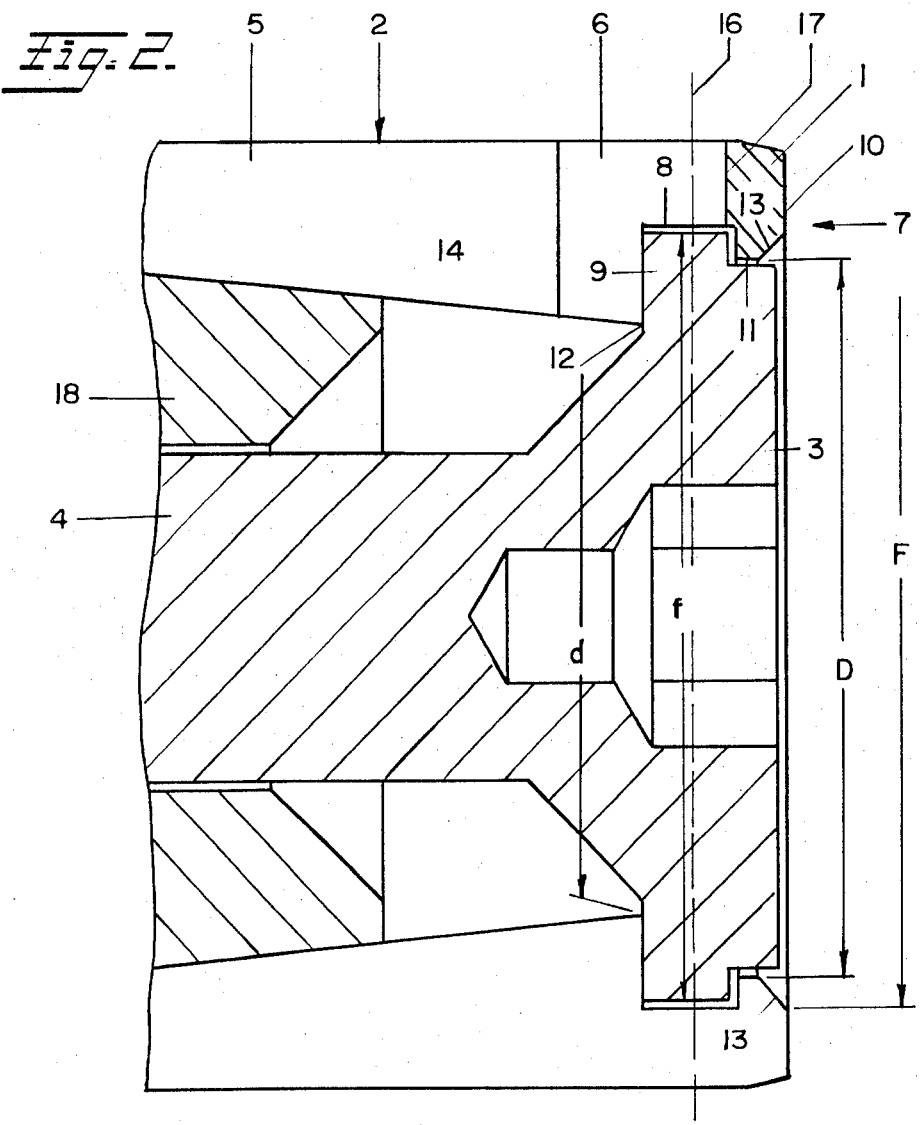

COLLET AND ADJUSTING SCREW THEREFOR

BACKGROUND OF THE INVENTION

1. Field of the Invention

The present invention relates generally to a collet and adjusting screw for clamping a work piece and more particularly to a collet including alternate slotted portions extending inwardly from a front end thereof arranged for engagement with an adjusting screw by means of a snapping connection.

2. Prior Art

In prior collets of this type, the snapping connection is provided by two collars on the head of the adjusting screw forming a groove therebetween, and by an annular groove in the collet. The adjusting screw is pushed into the collet using a special tool, by means of which the end of the collet is elastically expanded. The producing of the various collars and grooves on the screw head and in the collet is expensive and increases costs. In addition, a considerable part of the collet is worn away from the engaging surface by the snapping connection.

SUMMARY OF THE INVENTION

It is an object of the present invention to provide a snapping connection for clamping mandrels which can be simply produced and mounted, and which is compact such that it requires small space. This objective is met by means of a collet and adjusting screw for a clamping mandrel arranged for gripping a work piece, wherein the snapping connection includes an annular groove arranged in the front end of the collet, and a collar provided on the head of the adjusting screw which can be introduced into the annular groove.

Such a snapping connection can be produced considerably more simply than presently known snapping connections. It is basically necessary to produce the annular groove in the collet and to provide the adjusting screw with a suitable collar on the head. The so called engaging surface, that is, the surface upon which the collar of the adjusting screw bears on the inside surface of the annular groove can be made larger so that the surface pressure remains low. The shoulder of the collet, lying between the annular groove and the front end surface of the collet, is preferably reduced with respect to the inner edge of the more inward surface of the groove so that the internal diameter of the shoulder is greater than the internal diameter of the inner edge of the inward surface of the groove. The insertion of the adjusting screw is thereby enhanced. An even further advantage is obtained by chamfering the shoulder of the collet. The chamfering should extend outwardly so that the largest diameter of the chamfer is at least as great as the outer diameter of the collar on the head of the adjusting screw. In this form of snapping connection, the insertion of the adjusting screw into the collet can be effected simply by pushing the screw into the collet by hand. The inserting surface, provided by the chamfer, is fully separated from the engaging surface, so that mutual interference of these surfaces is not possible.

The center plane of the annular groove is preferably located in the collet approximately in the range of the slot ends. Greater elasticity of the end of the collet is thus obtained in comparison with prior collets, and the collet has an expecially long supporting length, since only a small space is needed for the new snapping connection.

An example embodiment of the present invention is illustrated in the drawings.

BRIEF DESCRIPTION OF THE DRAWINGS

FIG. 2 is an enlarged fragmentary longitudinal section view showing the front end of the mandrel, the collet and the head end of the adjusting screw of FIG. 1.

DESCRIPTION OF THE PREFERRED EMBODIMENT

Figure 1:
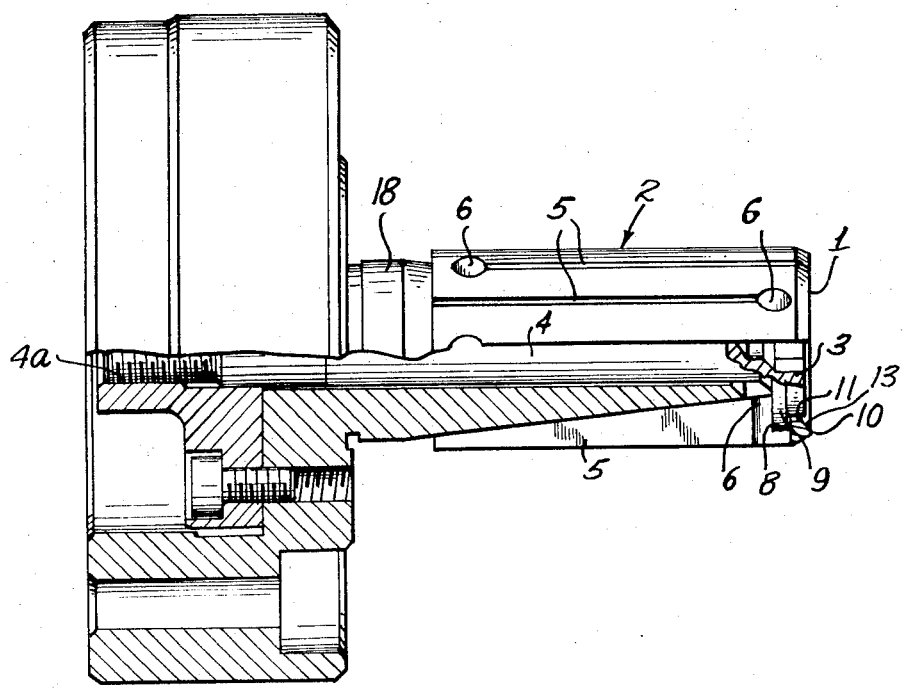
FIG. 1 is an elevational view of a mandrel according to the present invention with the lower half thereof shown in section.

A collet 2 having a front end 1 is shown in engagement with the annular head 3 of an axially movable adjusting screw 4. For clamping a work piece, the screw 4 is screwed as at 4a, into a more remote portion of the clamping mandrel 18. The collet 2 is mounted on the mandrel 18 and expanded. The adjusting screw 4 is reversed or backed off in order to release the work piece. Further backing off of the adjusting screw 4 results in removal of the collet from the mandrel 18. It is to be noted that, instead of an adjusting screw 4 in the case of power clamping, a so called clamping bolt may be used within the teaching of the invention.

The collet 2 is of a known integral design, except for the snapping connection, and has slots 5 which extend inwardly from opposite ends of the collet each slot extending nearly to the opposite end of the collet and terminating in an aperture 6.

The collet 2 is connected with the annular head 3 of the adjusting screw by a new snapping connection 7, comprising basically an annular groove 8, located inside the collet 2, and the collar 9 of the screw head 3 which is adapted for insertion into the groove.

The shoulder 11, located between the annular groove 8 and the front end surface 10 of the collet 2, is reduced with respect to the more inward edge 12 of the rear surface of the annular groove 8. The diameter D of the shoulder 11 is greater than the diameter $d$ of the edge 12. The shoulder 11 is provided with a chamfer 13, the larger diameter F of which is at least as large as the outer diameter $f$ of the collar 9 on the screw head, so that insertion of the screw head 3 into the collet 2 by pushing the former into the collet can be carried out.

The longitudinal section shown in FIG. 2 is taken in the plane of a slot through the collet 2. The lateral surface 14 of a slot 5 as well as the aperture 6 are thus visible.

An imaginary center plane 16 through the annular groove 8, which is indicated in dash line, is placed preferably in the range of the slot ends. The extreme end of a slot is indicated by the wall portion 17 near the front of the collet 2.

What is claimed is:

1. In a mandrel having an integral expansible collet for gripping a work piece provided with slotted portions extending inwardly alternately from opposite ends thereof, with an internal annular groove disposed inwardly of its front end surface thereby forming an annular lip portion between said groove and said front surface, and with a central opening in its front end, and means disposed within said collet for expanding it including an axially movable adjusting member having an annular head engaged in said groove, the improvement comprising providing said front end surface of said collet with a chamfer portion extending inwardly toward said groove, the larger diameter of said chamfer portion being at least as great as the outer diameter of the annular head of said adjusting member whereby the head of said adjusting member may be moved from a position contiguous with the front end surface of the collet and into said groove by moving said head axially against said chamfer portion with the force required to expand said collet sufficiently to permit said head to pass through said central opening in the front end of the collet and into said groove wherein said collet can contract, and the lip portion restrains the head against axial removal from the collet.

2. A mandrel according to claim 1 characterized in that the inner edge of the front surface of said annular groove terminates in an annular shoulder, and the inner edge of the rear surface of said groove terminates in an annular inner edge, the inner diameter of said shoulder being greater than the diameter of said inner edge.

3. A mandrel according to claim 1, in which the head of said adjusting member is rotatable in said groove, and said mandrel and said adjusting member have cooperating screw threads whereby, said adjusting member may be moved axially of said mandrel upon rotation of said adjusting member.

4. A mandrel according to claim 2 characterized in that said chamfer portion extends between said shoulder and said front end surface of said collet.

5. A mandrel according to claim 1 characterized in that said annular groove is disposed inwardly of said front end surface of said collet such that a mid portion of said groove is located in proximity to the ends of said slotted portions extending inwardly from the rear end of said collet.

6. A mandrel according to claim 2 characterized in that said annular groove is disposed inwardly of said front end surface of said collet such that a mid portion of said groove is located in proximity to the ends of said slotted portions extending inwardly from the rear end of said collet.

7. A mandrel according to claim 4 characterized in that said annular groove is disposed inwardly of said front end surface of said collet such that a mid portion of said groove is located in proximity to the ends of said slotted portions extending inwardly from the rear end of said collet.

8. In a mandrel having an integral expansible collet for gripping a work piece and provided with slotted portions extending inwardly alternately from opposite ends thereof, with a central opening in its front end, and means disposed within said collet for expanding it upon axial movement of said collet in one direction including an axially movable adjusting member for moving said collet in said one direction, the improvement comprising providing said integral collet with an internal annular groove disposed inwardly of the front end surface of the collet and having a substantially radially extending rear wall, providing said axially movable adjusting member with an annular head having a substantially radially extending rear side wall, said front end surface of said collet having an annular chamfer portion surrounding said central opening and extending inwardly toward said groove, the larger diameter of said chamfer portion being at least as great as the outer diameter of the annular head of said adjusting member, the inner edge of said chamfer portion and the inner edge of the front wall of said annular groove being connected by an annular shoulder, the diameter of said annular shoulder being greater than the inner diameter of said rear wall of the annular groove, said annular head being mounted in said annular groove with its rear side wall opposed to the rear wall of said annular groove, and providing means for moving said adjusting member axially within said mandrel whereby axial force may be applied to said collet to move it in said one direction and expand it.

9. A mandrel according to claim 8 in which said annular groove is disposed inwardly of said front end surface of said collet such that a mid portion of said groove is located in proximity to the ends of said slotted portions extending inwardly from the rear end of said collet.

10. A mandrel according to claim 8 in which the front side wall of said annular head of the adjusting member is opposed to the front wall of said annular groove whereby force may be applied to said collet to move it axially in a direction opposite to said one direction.

* * * * *